Dec. 31, 1935.  F. ECKERT  2,026,225
APPARATUS FOR FEEDING AND FORMING GLASS
Filed July 26, 1933  3 Sheets-Sheet 1

Fig. 1.

Witness:
W. B. Thayer

Inventor:
Fritz Eckert
by Brown & Parham
Attorneys

Dec. 31, 1935.  F. ECKERT  2,026,225
APPARATUS FOR FEEDING AND FORMING GLASS
Filed July 26, 1933  3 Sheets-Sheet 3

Witness;
W. B. Thayer.

Inventor:
Fritz Eckert
by Brown + Parham
Attorneys

Patented Dec. 31, 1935

2,026,225

UNITED STATES PATENT OFFICE 2,026,225

APPARATUS FOR FEEDING AND FORMING GLASS

Fritz Eckert, Berlin, Germany, assignor to Hartford-Empire Company, Hartford, Conn., a corporation of Delaware Application July 26, 1933, Serial No. 682,174

11 Claims. (Cl. 49—5)

This invention relates to apparatus for feeding and forming glass, particularly for the making of bottles. The present application comprises a continuation in part of my prior and copending application Serial No. 272,655, filed April 25, 1928, for "Method of and apparatus for feeding and forming glass", the structure disclosed in the present application comprising an amplified form of the machine therein shown.

Among the objects of this invention are to provide means for supplying glass from a parent body to the initial or parison mold of a forming machine while the glass being supplied to such mold is still connected with the parent body of glass, this in conjunction with a machine wherein provision is made for presenting the parison mold in a desired relationship to a downwardly opening outlet or orifice from a container for a body of glass, and to provide in connection with such machine for the subsequent forming of the glass charge into a completed bottle including inverting means for the mold, counter-blowing means, suitable parison transfer means, and final blowing means.

A further object of the present invention is to provide new and improved mechanism adapted for use in a machine of the character set forth for controlling the opening and closing of the parison mold and neck mold in response to cams and/or operating means positioned centrally of a rotary turret, these means being operative independently of the inversion of the parison mold and neck mold and the position thereof about their axis of inversion.

Further objects and advantages of my present invention will become apparent from a reading of the following specification and appended claims when taken in connection with the accompanying drawings, in which:

Figure 1:
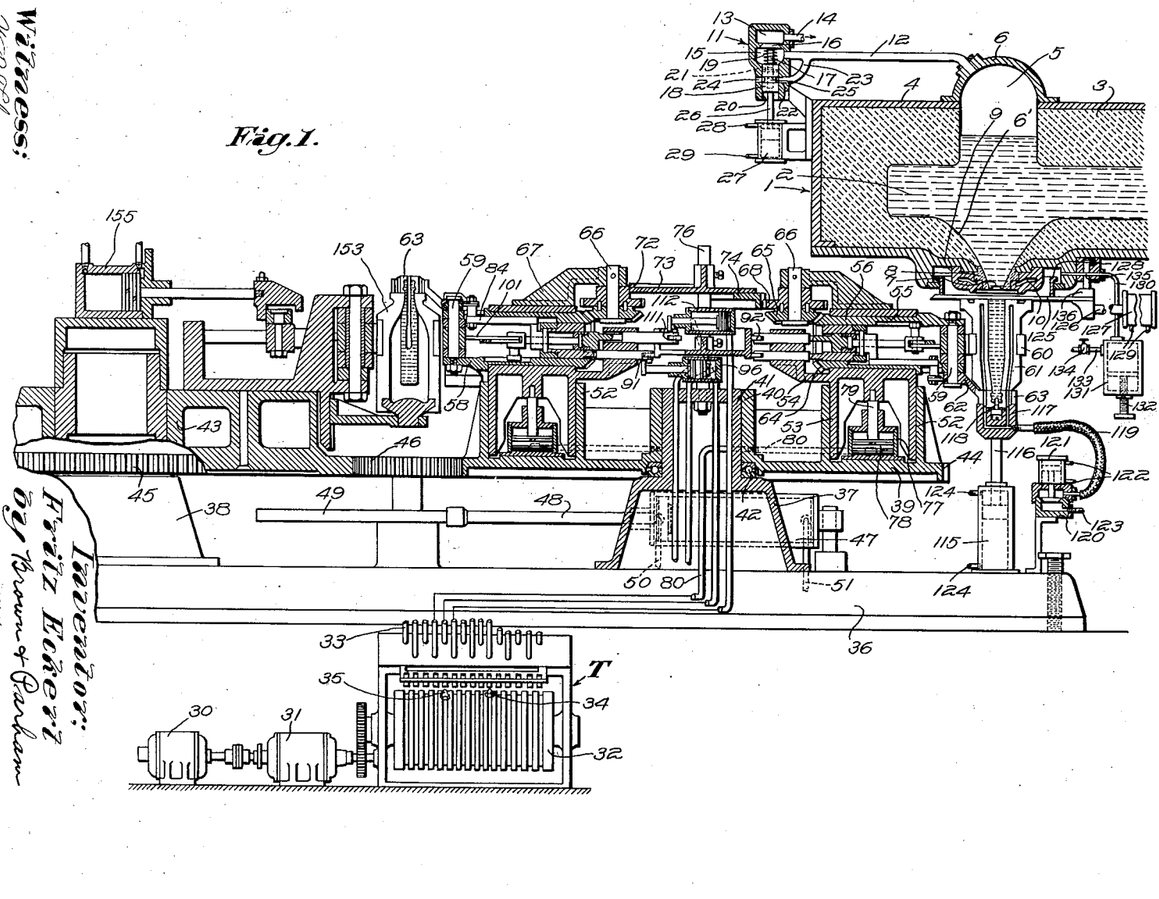
Figure 1 is a view of the major portion of the machine and the feeding device therefor principally in vertical section, certain portions of the machine and certain of the pneumatic connections being omitted for the purpose of clearness and for space reasons, certain other portions being foreshortened, and still other portions shown in side elevation rather than in section; some parts of the machine being also shown diagrammatically.

Referring first to the showing of Fig. 1, there is illustrated a forehearth generally indicated at 1, comprising a channel 2 which is adapted to be completely filled with glass, this channel communicating with any suitable type of glass furnace (not shown). The forehearth 1 is constructed of suitable refractory material 3 preferably enclosed in a metallic casing 4 which may be suitably supported in any desired manner. Extending upward from the channel 2 of the forehearth is a chamber 5 which is maintained air tight by a suitable cap member 6 secured to the outer casing 4 of the forehearth. Below and preferably in vertical alignment with the chamber 5 and communicating with channel 2 is a tapered well 6' having at its lower end an outlet orifice 7. This orifice is preferably formed within a suitable ring 8 of refractory material secured in position by a metallic casing 9, the purpose of this construction being to permit the interchange of the orifice rings 8 when it is desired to provide a larger or smaller orifice opening for the manufacture of articles of glassware of different sizes. Any suitable means, well known in the art, may be employed for removably securing the orifice ring 8 and the securing ring 9 in desired position against the metallic casing 4 of the forehearth. As illustrated, the supporting casing 9 is made hollow as indicated at 10, and to this hollow or cored out chamber, cooling fluid, such as air or steam, may be supplied in a manner well known in the art.

Means are provided for varying the pressure within the chamber 5 as desired, such means in the present instance, comprising a valve generally indicated at 11, which communicates with the interior of the chamber 5 through a suitable pipe 12. As illustrated, the upper chamber 13 of valve 11 may communicate through a pipe 14 with any suitable source of vacuum or subatmospheric pressure. Below the chamber 13 in the casing of the valve 11 is a chamber 15, these chambers communicating through a valve seat controlled by a poppet type valve 16. The valve 16 has a stem 17 slidably received in a valve member 18, a suitable compression spring 19 being interposed between the valve member 18 and the valve 16.

On lowering of the valve member 18 in the bore 20 in the valve 11, the spring 19 will first expand, leaving the valve 16 seated until the pin 21, which passes transversely through the valve member 18 and through a slot in the valve stem 17, engages the lower end of this slot, at which time the valve 16 will be opened, opening communication between the chambers 13 and 15 and thus between the vacuum supply pipe 14 and the pipe 12 leading to the chamber 5. There is provided connecting the pipe 12 and a port 22 communicating with the bore 20 of the valve casing, a branch pipe 23, and opposite this port 22 is a port 24 open to the atmosphere. The valve member 18 is provided, intermediate its ends, with a circumferential groove 25 adapted, in the position shown, to open communication between the ports 22 and 24, and thus to vent the pipe 12 and the chamber 5 to the atmosphere. The valve member 18 is secured to the upper end of a valve stem 26 which comprises the piston rod of a piston working in a pneumatic cylinder 27. Pressure to the cylinder may be admitted and exhausted through the pipes 28 and 29 communicating with the upper and lower ends of the cylinder respectively, and at their opposite ends communicating with a timer generally indicated at T.

Thus, when pressure is admitted to the pipe 28 and exhausted from the pipe 29, the valve member 18 will be lowered, which will result first in closing the communication between the ports 22 and 24 and thus sealing communication between the chamber 5 and the atmosphere. Following this, the valve 16 will be opened, as above set forth, to open communication between the chamber 5 and the source of vacuum. When the piston in the cylinder 27 starts from its lowermost toward its uppermost position, the first result will be the closing of the valve 16, cutting off communication between the chamber 5 and the source of vacuum through pipe 14, and thereafter further movement of the valve member 18 will compress the spring 19 and then open communication between the chamber 5 and the atmosphere. Thus at no time will the source of vacuum through the pipe 14 be in open communication with the atmosphere and the vacuum broken in this pipe.

If desired, suitable means may be provided in conjunction with the chamber 5 for admitting superatmospheric pressure in alternation with the subatmospheric pressure for the purpose of providing additional force, tending to cause the glass to flow downwardly through the outlet 7. Apparatus for accomplishing this is, however, not illustrated, as such apparatus and methods of use thereof are old in the art.

The timer T, hereinabove referred to, is preferably of the type utilized at the present time in the commercial "Hartford I. S." machine, which is shown and described in the Ingle patents Nos. 1,843,159, granted Feb. 2, 1932, and 1,911,119, granted May 23, 1933. It will be understood that any suitable timing means may be employed, if desired, the one chosen for illustration being merely a well known practical commercial structure and not involving invention on my part.

As illustrated, the timer is driven from a motor or other prime mover, generally indicated at 30, through a suitable reducing gearing 31, in which provision is preferably made for varying the ratio of speed reduction so as to vary the speed of rotation of the rotor or drum 32 of the timer T. Suitable provisions may also be made for providing a clutch engagement and disengagement between the motor and the timer, but as these means are old in the art, it is not thought necessary to illustrate or further to describe them. The timer T comprises a plurality of valves, each of which may bring an associated conduit, as 33, into communication either with a source of fluid pressure or with the atmosphere for the purpose of exhaust. Each valve may be operated first to open communication between the associated pipe as 33 with the source of fluid pressure by a short button, as illustrated at 34 (for another of the valves) coming into contact with suitable actuating means and thereafter pressure may be cut off and the pipe brought into communication with the atmosphere by a long button, as that illustrated at 35 (for still another valve), engaging said actuating means. It will be understood that these buttons, as 34 and 35, may be adjustable in suitable slots about the drum or rotor 32 of the timer in any desired manner, so as to adjust the timing of the associated mechanism as desired. Thus, by properly positioning buttons as 34 and 35 on the rotor 32 of the timer, the associate mechanisms of the machine and feeder may be timed as desired to accomplish the results hereinafter to be set forth in detail.

Returning now to the forming machine, per se, which as illustrated is of the two-table type, the machine is mounted upon a suitable base 36 upon which are secured a pair of upstanding turret supports 37 for the blank or parison table and 38 for the blow table. Suitably mounted upon the support 37 is the blank or parison table 39, this table having an internal flange 40 sleeved around the upstanding cylindrical portion 41 of the standard 37, and supported vertically upon suitable ball bearings generally indicated at 42.

It will be understood that the same or any suitable bearing structure may be provided in conjunction with the blow table 43. The blank and blow tables 39 and 43 are provided on their outer peripheries with gear teeth 44 and 45 both meshing with an intermediate gear 46.

Means are provided for rotating the blank and blow tables intermittently and simultaneously, such means comprising a pneumatic cylinder 47, the piston rod 48 of which carries a rack member 49 which is adapted to index the gear 46 around to rotate the tables in 90° intermittent steps in substantially the same manner as particularly illustrated and described in the patent to Lynch et al. 1,787,635, granted Jan. 6, 1931. Inasmuch as the particular construction of the table driving means forms, per se, no part of the present invention, it has not been thought necessary to describe or illustrate them further, but reference may be had to the Lynch et al. patent for such disclosure. The cylinder 47 is provided at its opposite ends with pipes 50 and 51 which preferably communicate with the timer T and to which pressure is supplied and exhausted at suitable times to effect the desired table rotation.

I have illustrated in the accompanying drawings, blank and blow tables, each having four similar blank or parison forming and final blowing units respectively. It will be understood, however, that any desired number of such units may be provided on each table and that in the event a number different than four is provided, suitable changes may be made in the driving means to cause the intermittent steps of the tables to be properly coordinated with the number of units provided, so that the units will be successively moved to predetermined stations, including a charging station for the parison forming units, wherein each unit including a parison mold and a neck mold is successively in vertical alignment with the orifice 7, as above described.

Inasmuch as the blank forming units are each similar to the others, a description of one will suffice. On the blank table 39 and eccentric of the center of this table, is a socket or guideway structure 52 which is preferably made rectangular or non-circular in internal section. Within this guideway is arranged for vertical sliding movement the downwardly extending portion 53 of a housing, generally indicated at 54. The housing 54 is formed with a horizontal and preferably radial bearing portion 55 within which is arranged, for rotation, a drum member 56 (see also Figs. 3 and 4). The drum member 56 carries, at its outer ends, brackets 57 and 58 in which is received a pintle 59 on which are hinged bracket members of mold holders 60 carrying the halves of the blank or parison mold 61 and bracket members of mold holders 62 carrying the halves of the neck mold 63.

Means are provided for inverting the drum member 56 and for retaining it in both inverted and reverted positions, such means comprising bevel gear teeth 64 formed on the inner end of the drum member 56 and meshing with a bevel gear 65 mounted for rotation about a stud shaft 66, this shaft being carried by a bracket 67 secured to the housing 54. Secured to the bevel gear 65 and also arranged for rotation about the shaft 66 is a member 68 having gear teeth 69 thereupon adapted to mesh with the teeth of a stationary rack 70, this rack being vertically elongated for purposes to be hereinafter set forth. Also formed on the member 68 is a concave face 71 which is adapted to engage in sliding contact with a stationary cylindrical surface 72 formed on the outside of a member 73. The member 73, which also carries the member 74 on which the rack teeth 70 are cut, is secured, as by set screws 75, to the upper ends of a pair of rods 76 secured to and extending upwardly from the standard 37. Thus, as a given parison forming unit starts from station A (the charging station), Fig. 2, in the direction of the arrow in that figure, it will first be inverted due to the meshing engagement of the teeth 70 and 69 and of bevel gears 65 and 64 to revert the molds 61 and 63 between stations A and B and present them and the glass therein at the latter station in neck-up position.

Figure 2:
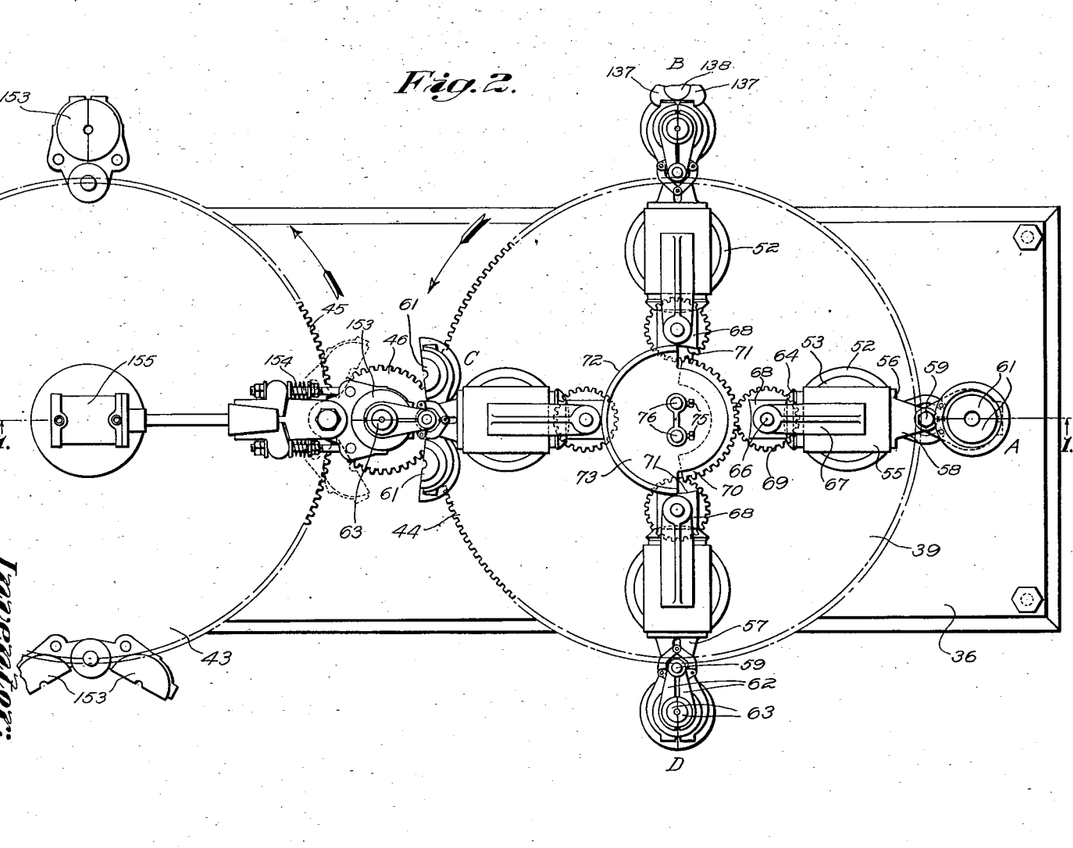
Fig. 2 is a plan view of the portion of the forming machine shown in Fig. 1, certain parts being omitted for clearness of illustration.

During movement of the molds from station B through station C and to station D, the molds and their drums 56, by which they are carried, will be locked against inversion due to the concave face 71 of the member 68 sliding in engagement with the surface 72 of the member 73, and thus preventing rotation of the member 68 and inversion of the drum 56. From station D to station A, the gear teeth 69 will again engage with the rack teeth 70 and will invert the parison and neck molds to bring them to a neck-down position at the charging station A. The molds are locked against inversion while at station A due to the meshing engagement of the teeth 69 and 70, and this engagement is maintained during vertical movements of the molds at station A due to the vertical elongation of the teeth 70.

For moving the parison mold 61 and neck mold 63 vertically at the charging station, each unit is provided with a pneumatic cylinder 77 having a piston 78 therein, the rod 79 of which is connected to the housing 54. The cylinder 77 is mounted upon the blank mold table 39, so that when pressure is admitted to this cylinder beneath the piston 78 thereof, as through the pipe 80 from the timer T, the entire housing and the blank and neck molds carried thereby will be moved vertically upward to bring the molds to the desired position for the supplying of a charge of glass thereto. When pressure is exhausted through the pipe 80, the weight of the parts may be depended upon to move the molds downwardly, or if desired, pressure may be supplied to the upper end of the cylinder 77 for this purpose. It will be seen in Fig. 1 that the pipe 80 is formed in two parts, one of which rotates with the mold table and the other communicates with the first portion through registering ports in the upstanding cylindrical portion 41 of the standard 37 and in the flange 40 of the mold table respectively when the unit in question is in charging position. Thus it will be impossible to supply pressure to any of the cylinders 77 except that one associated with the unit in charging position.

Figure 3:
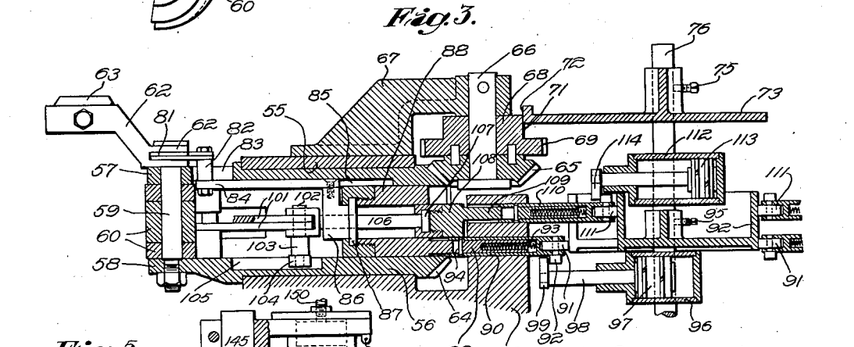
Fig. 3 is a fragmentary view principally in vertical section, illustrating the operating means and linkages for opening and closing the parison mold and neck mold.
Figure 4:
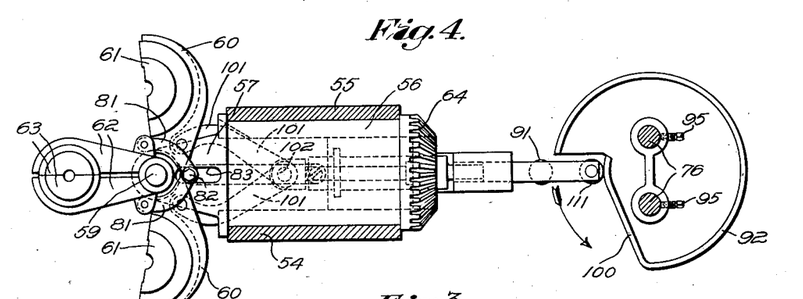
Fig. 4 is a view partially in plan and partially in horizontal section of the apparatus of Fig. 3, certain parts being omitted for clearness of illustration.

Means are provided for opening and closing the blank mold and neck mold independently. Taking up first the neck mold operating means, there is provided, as best illustrated in Figs. 3 and 4, a mechanism including links 81 connected between the neck mold carrying arms 62 and a pintle 82 which is arranged to slide in a slot 83 formed in the bracket 57. Secured to the pintle 82 at its inner end and within the drum 56, is a slide member 84 arranged for sliding movement longitudinally of the drum in a slot 85 formed therein. To the inner end of the slide member 84 is secured a member 86 having a swivel connection 87 with a sleeve member 88 arranged for sliding movement axially and concentric of the drum 56, but not partaking of the inverting movement thereof.

The member 88 is provided with a cylindrical extension 89 about which is sleeved a hollow cylindrical member 90 carrying at its outer end a cam roller 91 and a stud 92. The end of the extension 89 is axially bored to receive a compression spring 93 tending to move the sleeve member 90 outwardly along the member 89. This movement is limited by a cross pin 94 in the sleeve member 90 and extending through a slot in the member 89 to limit the movement of the sleeve member in both directions. The cam roller 91 bears upon the outer surface of a stationary cam 92 which is secured to the rods 76, as by set screws 95.

The configuration of the cam surface 92 is shown best in Fig. 4 in which the direction of movement of the forming unit around the cam is shown by an arrow, the parts being in the position they occupy at station C, the transfer station, that is, with the blank mold opened and the neck mold closed. Means are provided at this station for opening the neck mold while the unit is at rest at the station, such means comprising a pneumatic cylinder 96 suitably secured between the rods 76 and provided with a piston 97 carrying the piston rod 98. At the outer end of this piston rod at the left, as seen in the drawings, there is provided an upstanding dog 99 adapted to engage outside the stud 92, so that upon movement of the piston 97 to the right in the cylinder 96, the dog 99 will engage the stud 92 to move the sleeve 90 positively inwardly. Then due to the engagement of the cross pin 94 with the right hand end of the slot formed in the extension 89, this extension and the member 88 will be moved inwardly of the table. Motion is transmitted from this part through the swivel connection 87, members 86 and 84 and pintle 82 to the links 81 and mold holders 62 to open the neck mold. Upon continued rotation of the table, the cam roller 91 will ride up the face 100 (Fig. 4) of the cam 92 and cause the closing of the neck mold. In this case, however, the force applied to close the mold will be resilient due to the compression of spring 93, so that in the event glass or some other foreign material remains between the halves of the neck mold, breakage of the parts will be prevented.

Means are provided for opening and closing the halves of the parison mold 61 in substantially the same manner as that described above for the neck mold. Such means comprise a pair of links 101 connected between the holders 60 for the parison mold and a cross head or pintle 102. This pintle has an extension 103 carrying a roller 104 adapted to work in a slot 105 formed in the inside of the drum 56, and thus to prevent relative rotation between the operating means for opening and closing the parison mold and the drum about the axis of the latter. Pivotally connected to the pintle 102 is a shaft 106 which passes freely through a central axial bore in the member 86 and is provided at its right hand end, as seen in Fig. 3, with a swivel connection 107 with a slide member 108 corresponding generally to the slide member 88 and adapted for free sliding movement in a bore of the latter. The slide member 108 has an extension 109 on which is sleeved a member 110 carrying at its inner end a cam roller 111. The extension 109 and sleeve member 110 are connected together in exactly the same manner as are the extension 89 and sleeve member 90 and for the same purpose. The sleeve members 90 and 110 are preferably received within suitable bores in a bracket extension of the housing 54 as illustrated, thus preventing rotation of their associated slide members 88 and 108, respectively, when the drum 56 is rotating to invert the molds. The cam roller 111 engages an upper portion of the same cam surface 92 previously described. The cam surfaces in contact with the molds 91 and 111 are the same as shown in the accompanying drawings, although this is not necessarily the case should some other cycle of operation be desired for the machine. For opening the blank mold at station C there is provided a pneumatic cylinder 112 having a piston 113 therein, the piston rod of which carries a dog 114 at its outer end for engaging a stud on the sleeve member 110, the operation being identical with that of the neck mold opening means. Pressure in the opposite ends of cylinders 96 and 112 may be supplied and exhausted through suitable pipes, as illustrated in Fig. 1, from the timer T.

Means are provided at a charging station A for exhausting the air within the molds and thus for assisting in the supplying of a charge of glass thereto. For this purpose, there is positioned below and in vertical alignment with the position of the mold at station A and with the orifice 7, a pneumatic cylinder 115. The piston rod 116 extending from the piston of this cylinder carries at its upper end a suction applying head 117, which is adapted to contact with the undersurface of the neck mold 63, and which has suction passages adapted to register with the suction passages of the neck mold, which passages in turn register with suction passages formed between the halves of the blank mold, as in the usual practice. The head 117 also carries a neck pin 118 for forming the initial blow opening in the mouth of a parison being formed in the blank mold and neck mold. Vacuum is supplied to the head 117 through the pipe 119 from a valve 120, a portion of the pipe 119 being flexible to provide for the vertical movements of the head 117. The valve 120 is of the poppet type and is adapted to be operated by a pneumatic cylinder 121, pressure to which is supplied through the pipes 122 from the timer T. The pipe 123 communicates with the valve 120 and with a suitable source of vacuum or subatmospheric pressure (not shown). Pressure may also be supplied to the upper and lower ends of the cylinder 115 through the pipes 124 from the timer T.

After a charge of glass has been supplied to the blank mold and neck mold and the molds have been retracted away from the orifice 7, it is necessary to shear the glass in the molds from the parent body of glass in the forehearth. For this purpose, I have illustrated in Fig. 1 a single shear blade 125 secured to the outer end of a piston rod 126 extending from a pneumatic cylinder 127 which is shown foreshortened for convenience of illustration. As shown, the shear blade 125 passes across the upper surface of the mold 61 in close proximity thereto, so as to shear the glass off evenly and level with this surface. This blade, however, has a double function in that the upper surface thereof contacts with and seals against a downwardly extending flange 128 secured to the underside of the forehearth, and thus forms a chamber closed at its bottom by the shear blade 125 to which pressure may be applied for forcing the glass upwardly through the orifice 7 and/or preventing continued flow of the glass downwardly through the orifice between the times for charging successive molds. The shear operating cylinder 127 is provided at its opposite ends with pressure supplying pipes 129 which communicate with the timer T, so that pressure may be supplied and exhausted to and from the cylinder to operate the shear at the desired times.

The interior of the chamber beneath the orifice, which is closed by the shear blade 125 as aforesaid, communicates through a passage or pipe 130 with a pressure chamber 131 which, as shown, is manually variable in capacity, the bottom of the chamber being mounted upon the upper end of a threaded bolt 132 for this purpose. Pressure is supplied to the chamber 131 through the pipe 133 controlled by a valve 134 which is preferably of the needle type and is adapted to be opened only a very slight amount. Communication between the chamber 131 and the chamber beneath the orifice and closed by the shear blade 125 may be opened and cut off by a valve 135 which is operated in response to the positioning of the shear blade 125 to close the chamber beneath the orifice. As shown, the shear blade 125 carries a cam 136 adapted to contact with the underside of the movable member of the valve to open it when the shear is in fully closed position, as illustrated in Fig. 1. Prior to this time, however, the valve 134 which is open a very slight amount permits pressure to build up within the chamber 131, the volume of which is adjustably controlled as aforesaid. Upon the movement of the shear blade to the position shown in Fig. 1, the valve 135 is opened, thus admitting a large flow or puff of pressure air from the chamber 131 to the chamber formed by the shear blade and the flange 128 beneath the orifice. This large flow of pressure tends to force the glass upwardly through the orifice 7. If the pressure were continued in large amount, however, it might force air upwardly through the glass and tend to form bubbles therein. This is not desired, so that the pressure is automatically cut down due to the fact that only a very small amount of air can flow in any given time past the valve 134, just sufficient to balance the downward force of the glass and the possible leakage. As soon as the shear blade 125 is retracted, however, and the valve 135 closed, pressure may again build up within the chamber 131. It will be understood that the volume of the chamber 131 will be so adjusted that the amount of the puff or pressure supplied from the chamber 131 to the chamber beneath the orifice will be built up just enough in the chamber 131 between charging of successive molds to maintain the glass against flow, but not enough to permit any air to force upwardly through the glass in the orifice.

At station B, or the first station subsequent to the feeding, there is preferably provided means for counterblowing charges of glass supplied to the parison mold 61. For this purpose, I have illustrated in Fig. 5 suitable mold locking means and counterblowing means, which are substantially the same as those illustrated and described in the Lynch et al. Patent 1,787,635, above referred to. As shown, there is provided a mold lock including the locking members 137 pivoted on the standard 138 (Figs. 2 and 5) and adapted to be moved to a position to lock the mold halves together by a pneumatic cylinder 139 to the opposite ends of which pressure may be supplied through pipes 140 from the timer T. The parison mold may if desired be provided with portions engaging portions of the neck mold to hold the latter closed when the parison mold is locked in closed position. The standard 138 is supported in a suitable bracket 141 upon the base 36 of the machine.

Figures 5, 6:
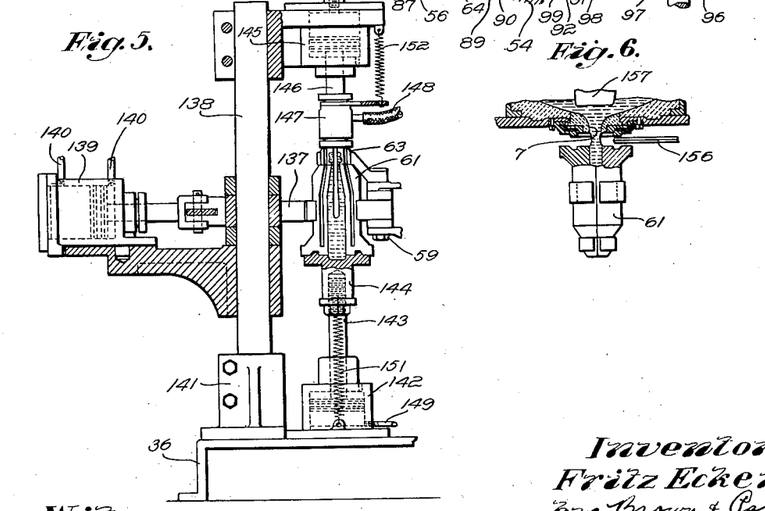
Fig. 5 is a fragmentary view partially in elevation and partially in vertical section illustrating the counterblowing of a charge in the parison mold.
Fig. 6 is a view partially in elevation and partially in vertical section showing a modified construction including double shears rather than single shears as illustrated in Fig. 1.

Also positioned on the base 36 is a pneumatic cylinder 142, the piston rod 143 of which carries, at its upper end, a suitable recessed bottom plate 144 for engaging with the now lower end of the parison mold 61 to close such end. The recess in the plate 144 is for the purpose of providing space into which the glass may be forced upon the application of counterblowing air through the neck opening of the glass.

Mounted upon the upper end of the standard 138 is a pneumatic cylinder 145, the piston rod 146 of which carries a suitable blowhead 147 adapted to engage the now upper side of the neck mold 63. Blowing pressure may be supplied to the blowhead 147 through the pipe 148, at least a portion of which is made flexible so as to provide for the vertical movements of the blowhead. The cylinders 142 and 145 are preferably operated by pressure in one direction only, this pressure being supplied thereto through pipes 149 and 150 respectively leading to the timer T. Return movement of the pistons in these cylinders is accomplished, as shown, by tension springs 151 and 152 for cylinders 142 and 145 respectively, these springs being connected between suitable anchorages fixed to the cylinders 10 and suitable brackets extending from the piston rods thereof.

The blow table 43 is provided as shown with four final blow units, including final blow molds 153, these molds being mounted and being adapted to be opened and closed in exactly the same manner as the final blow molds of the Lynch et al. Patent 1,787,635, the closing movement preferably being resilient and operating through the compression springs 154 in response to movement of the piston within the cylinder 155, pressure to which is supplied from the timer T and the opening of this mold being accomplished by a suitable cam (not shown). Suitable means (not shown) may be provided for applying blowing pressure to the interior of the molds 153 either at one or more stations, such means not being particularly illustrated in the accompanying drawings, but being preferably the same as, or equivalent to, those shown in the Lynch et al. patent above referred to. Inasmuch as the construction and operation of the final blowing means form no part of the present invention, I have not shown or described this structure in detail, it being understood that such means may be constructed in any conventional manner, for example, that taught in the Lynch et al. patent above referred to.

I shall now describe the operation of the apparatus hereinbefore described as to construction. A parison forming unit including an empty parison mold and a neck mold is brought by the rotation of the blank mold table 39 to station A at the position of the parts similar to that shown in Fig. 1, that is, in neck down position and in vertical alignment with the outlet opening or orifice 7 of the forehearth. At some time, either when the mold comes to this position or slightly in advance thereof, the shear blade 125 is retracted and flow of glass is prevented by the application of vacuum to chamber 5 through the valve 11. Pressure is then admitted to the bottom of cylinder 77 to move the housing 54 and the blank and neck molds carried thereby upwardly. I contemplate that the molds may be moved either into actual contact with the underside of the forehearth or merely adjacent thereto, according as it is desired. In either case, upon the breaking of the vacuum in chamber 5 by the valve 11, the glass in the forehearth commences to run by gravity down into the cavity of the mold. Under some circumstances, it may be desired to augment this gravity flow as by the application of superatmospheric pressure to the chamber 5. I have not, however, shown apparatus for applying such pressure, and it will be understood that the use thereof is optional. As soon as the parison and neck molds are at their uppermost position, either in engagement with the underside of the forehearth or adjacent thereto, as may be desired, pressure is admitted to the lower pipe 124 of cylinder 115 to force the head 117 upwardly against the neck mold and to position the neck pin 118. At any time after this head is positioned, the valve 120 may be opened by the admission of pressure to the lowermost of the pipes 122 of cylinder 121, thus opening the head 117 and the suction passages of the parison mold and neck mold to vacuum through the pipe 123. This vacuum will be effective to draw the glass downwardly into the parison mold and neck mold as soon as the gravity flow of glass through the orifice 7 is sufficient that the column of glass issuing from the orifice 7 seals the upper end of the blank mold 61. When the parison and neck molds are filled, or substantially so, pressure may be exhausted beneath the piston 78 of cylinder 77 and the molds moved downwardly which will cause an attenuation of the glass connecting the parent body of glass in the forehearth and the glass in the molds at a position slightly below the orifice 7. The vacuum connection to the head 117 may be cut off at any time desired, either before or after the lowering of the parison mold. When the parison mold has been moved to its lowermost position, the shear blade 125 is moved forwardly by the admission of pressure to the right hand end of cylinder 127 to sever the attenuated neck of glass. The end of this movement of the shear blade will open the valve 135 admitting pressure to the interior of the chamber formed by the shear blade and the flange 128. At or before this time, however, pressure is admitted to the upper end of the cylinder 27 to cut off communication between the chamber 5 and the atmosphere and open communication between this chamber and the source of vacuum through pipe 14, so that a negative pressure is exerted on the glass in the chamber 5 which will tend to prevent the further flow of glass through the orifice and may even tend to move the glass upwardly out of contact with the shear blade particularly when used in conjunction with the pressure admitted to the chamber closed by the shear blade. Thus from the point of view of the feeder, the cycle has been completed and nothing further takes place until just before it is desired to supply a charge of glass to the next succeeding mold.

Tracing now the continued operation of the machine acting upon the charge of glass which has been supplied to the parison mold and neck mold, the next occurrence is the retraction of the head 117 which, of course, is preceded by the cutting off of vacuum to this head as otherwise the vacuum would be broken. This is accomplished by the supplying of pressure from the timer T to the upper end of cylinder 115. The machine is now indexed along one step in its rotation to bring the filled parison and neck molds from station A to station B. During this time, the molds are inverted through the mechanism previously described, and due to the meshing engagement of the gear teeth 69 with the rack teeth 70. At station B the molds 61 and 63 have completed their inverting movement and the parts are now ready for counterblowing, which is accomplished as best illustrated in Fig. 5. Pressure is admitted to the outer end of a mold lock cylinder 139 to clamp the halves of the parison mold 61 in locked position and at about the same time, pressure is admitted to the lower end of the cylinder 142 through the pipe 149 to position the bottom plate 144, and also to the upper end of cylinder 145 through pipe 150 to position the blow head 147. Counterblowing pressure is then admitted through the pipe 148 to counterblow the parison in the usual manner.

After the counterblowing of the parison has been completed, pressure is exhausted through the pipes 149 and 150 to permit retraction of the bottom plate and blowhead respectively by the springs 151 and 152 and pressure is exhausted from the outer end of the mold locking cylinder 139 and the mold lock moved out of its operative position by pressure admitted to the inner end of this cylinder. The mold carrying the counterblown parison is then moved from station B to station C. Upon arrival at this station, pressure is admitted to the left hand end, as seen in Fig. 3, of cylinder 112 to move the dog 114 to the right and thus to open the parison mold through the mechanism above described, which leaves the parison supported by the neck mold 63 in the position of the parts seen in Fig. 1 at the left. The blow mold 153 is then closed about the parison by the admission of pressure to the left hand end, as seen in that figure, of cylinder 155. The neck mold 63 is then opened by the admission of pressure to the left hand end, as seen in the drawings, of cylinder 96, thus causing the movement of the piston 97 therein to the right and opening the neck mold as hereinabove set forth.

The parison has thus been transferred to the blow mold and is reheated therein and subsequently blown to final form, as fully set forth in the disclosure of the Lynch et al. patent referred to above. During movement of the parison and neck molds from station C to station D, these molds are closed due to the cam rollers 111 and 91 riding up the inclined face 100 of the cam 92, and are thereafter held closed by these rollers riding about the constant diameter portion of the cam until the mold again arrives at station C. During the movement of the mold from station B to station D, inversion is prevented as above set forth, due to the engagement of the concave surface 71 with the surface 72 of the member 73. In moving from station D to station A, the blank and neck molds are again inverted, due to the engagement of the gear teeth 69 with the rack teeth 70 to bring the parts into the position which they occupied at the start of the description of the operation. It will be understood that the timer T will be so adjusted as to cause the sequence of operations as above set forth or any desired variation thereof within the scope of this invention, as set forth in the appended claims.

In Fig. 6, I have shown a modification of my invention wherein a double shear construction, generally indicated at 156, is employed in place of the single shear 125. In conjunction with this double shear, there is preferably employed in the forehearth an implement 157 operating similarly to the plungers or corresponding implements now in general use in commercial gob feeders. The double shear construction shown in Fig. 6 may be constructed and operated in the same manner as the shears shown for a corresponding purpose in the patent to O'Neill 1,537,961, granted May 19, 1925. In view of the O'Neill disclosure, it is believed unnecessary to illustrate the particular operating means which is to be employed. In the event that a double shear is used, I may, and preferably do, eliminate the pressure chamber beneath the orifice and the associated mechanism, and also effect a shearing of the glass out of smearing relation with either the orifice or the top of the mold.

This construction is preferable under certain circumstances. When using this form of the invention, and under some circumstances when using the other form, it may be desirable to use a vertically movable implement, as that indicated at 157, for controlling the flow of glass from the orifice and retracting the cut end thereof subsequent to the shearing.

It will be understood that modifications may be made of the construction of the several parts and certain parts may be omitted without departing from the spirit of my invention. Also, certain features may have independent utility apart from the remaining features. I do not wish to be limited, therefore, except by the scope of the appended claims, which are to be construed as broadly as the state of the prior art permits.

I claim:

1. In combination, a glass feeder having a downwardly opening outlet from which molten glass may issue, an intermittent rotated carrier adjacent to said feeder, a vertically movable and invertible mold on said carrier in position to be brought to a glass receiving station below and substantially in line with said outlet by an intermittent rotary movement of the carrier, means for inverting said mold, means for raising the inverted mold when at said glass receiving station and thereafter lowering said mold when said mold has been charged with glass from said outlet, means for severing the glass in the mold from the glass at the outlet, and means for reverting the charged mold.

2. In glass making apparatus in combination, an intermittently rotating carrier, a parison mold and an associated neck mold movable with said carrier, a vertically movable housing carried by said carrier and supporting said parison mold and said neck mold, means for effecting vertical movements of said housing to present the parison mold and neck mold while inverted to a source of glass supply, means for supplying glass to the cavities of said molds while the glass being supplied is still connected with the parent body of glass in said source, means for thereafter separating the glass in the molds from that in said source, means for thereafter rotating said molds with respect to said housing to thereby revert the parison mold and neck mold, and means to open and close said parison mold and said neck mold.

3. Apparatus for making hollow glassware, comprising in combination an intermittently rotating carrier, means for rotating said carrier intermittently, a vertically movable housing carried by said carrier, means for moving said housing vertically with respect to said carrier, a parison mold and a neck mold carried by said housing and invertible in respect thereto about a substantially horizontal axis, means for independently opening and closing said parison mold and said neck mold, means operable in response to the rotation of said carrier and independent of the vertical movement of said housing for inverting said parison mold and neck mold with respect to said housing, means for operating the aforementioned parts to present said parison mold and said neck mold while in neck-down position beneath a downwardly opening outlet from a source of molten glass for the receipt of a charge of glass from said source while the glass being supplied to said molds is still integral with the parent body of glass in said source, means for thereafter separating the glass in said molds from the glass in said source, and means for thereafter and during movement of said carrier inverting said parison mold and said neck mold and the glass therein to bring the glass in said molds neck uppermost for further operations thereon.

4. In glass making apparatus in combination, an intermittently rotating carrier, a vertically movable housing carried by said carrier, a parison mold and an associated neck mold mounted upon said housing for opening and closing movements with respect thereto and also for inverting movements with respect thereto about a substantially horizontal axis, means for effecting vertical movements of said housing, means independent of the vertical movements or position of said housing for effecting the inversion of said molds with respect to said housing, the aforesaid means being operative to present said parison mold while inverted to a source of glass supply at one of the dwell positions of said carrier, means for creating a vacuum within said parison mold and neck mold at least to assist in the supplying of glass thereto from said source while said molds are at a dwell position of said carrier and in charging relation with respect to said source and while the glass being supplied thereto remains integral with the parent body of glass in said source, means for thereafter and while the molds remain in vertical alignment with said source during said dwell severing the glass in said molds from the parent body of glass, means for effecting the inversion of said parison mold and neck mold and the glass therein, and means for thereafter causing the parison mold to open to leave the glass suspended from said neck mold.

5. In an article forming machine, the combination with a molten glass container having a submerged outlet, of an intermittently rotating carrier, an invertible parison mold on said carrier and arranged to be brought at one of the dwell positions of said carrier to a position adjacent to and in vertical alignment with the outlet of said container for the receipt of a charge of glass therefrom, an independent neck mold associated with said parison mold, fluid-actuating means for moving said parison mold with respect to said carrier vertically upward toward said outlet for the receipt of glass therefrom while the glass being supplied to the parison mold remains integral with the glass in said container and thereafter for retracting said parison mold downward from said outlet, glass severing means operable between the upper end of said parison mold and said outlet subsequent to the downward retraction of said parison mold from said outlet, means operable thereafter and subject to the rotation of said carrier for inverting said parison mold and said neck mold and the glass therein, means for thereafter opening said parison mold to leave the parison formed therein suspended from said neck mold, and means for timing the operations of all the aforesaid means and for causing their operation in a predetermined sequence.

6. In an article forming machine, the combination with a molten glass container having a submerged outlet, of a rotary carrier, means for rotating said carrier intermittently, a suction parison mold on said carrier and arranged to be brought at one of the dwell positions of said carrier into vertical alignment with said outlet, an independent neck mold associated with said parison mold, fluid actuated means for moving said parison mold and said neck mold while inverted upwardly into proximity with said outlet for the receipt of a charge of glass therefrom and thereafter for retracting said parison mold downwardly from said outlet, means for applying suction to the interior of said parison mold during the supplying of glass thereto from said outlet for assisting in the supplying of glass to the molds, means operable after the parison mold and neck mold have been retracted downwardly from said outlet for severing the glass connecting the glass in the molds and that in said container, means for inverting said parison mold and neck mold in response to the rotation of said carrier to bring the neck mold uppermost, means for thereafter opening said parison mold to leave the formed parison suspended from said neck mold, and means for causing all the aforesaid means to operate at predetermined times and in a predetermined sequence.

7. Apparatus for forming hollow glass articles, comprising the combination with a molten glass container having a submerged outlet of an intermittently rotating carrier, means for rotating said carrier intermittently, a vertically movable housing mounted on said carrier, means for moving said housing vertically with respect to said carrier, a parison mold and a neck mold carried by said housing and invertible in respect thereto, and constructed and arranged to be brought at one of the dwell positions of said carrier into vertical alignment with the outlet of said glass container for the receipt of a charge of glass in said molds from said outlet while the glass being supplied to said molds remains connected with the parent body of glass in said container, means for exhausting air from said parison mold and neck mold to assist in the supplying of glass thereto from said container, means for severing the charge of glass in said molds from the glass in said container after the molds have been retracted downwardly away from the outlet of said container, means for inverting said parison mold and neck mold with respect to said housing during movement of said carrier and in response thereto and independent of the vertical movement and position of said housing with respect to said carrier, and means for opening said parison mold to leave the formed parison suspended from said neck mold for subsequent operations thereon.

8. In glass making apparatus in combination, an intermittently rotating carrier, a parison mold and an associated neck mold movable with the carrier, a vertically movable housing carried by said carrier and supporting said parison mold and said neck mold, means for effecting vertical movements of said housing to present the parison mold and neck mold while inverted to a source of glass supply, means including suction-applying means for said parison mold for supplying glass to the cavities of said molds while the glass being supplied is still connected with the parent body of glass in said source, means for thereafter separating the glass in said molds from that in said source, means for thereafter inverting said molds with respect to said housing to bring the neck mold uppermost at a subsequent dwell station of said carrier, means at such subsequent dwell station for closing the bottom end of said parison mold and for supplying blowing pressure to the upper end of said neck mold for forming a blowing cavity in the parison, a final blow mold, means for transferring the parison formed in the parison mold and neck mold by its neck to the final blow mold so that it may be blown therein to final form, and means for timing the operation of all the aforesaid means.

9. Apparatus for forming hollow glassware, comprising a rotary carrier, a housing on said carrier, a drum mounted in said housing for rotation with respect thereto about a substantially horizontal axis, a parison mold and a neck mold mounted on said drum for opening and closing movement, independent mechanical linkages within said drum for effecting the opening and closing of the parison mold and neck mold, each linkage including a member arranged concentric with the axis of said drum and slidable axially thereof, and operating means for each of said linkages connected with said slidable members respectively and so constructed and arranged as to open and close the associated parison mold and neck mold respectively independently of the position or rotation about the axis of said drum of such molds.

10. Apparatus for forming hollow glassware, comprising a rotary carrier, a housing on said carrier, a drum mounted in said housing for rotation with respect thereto about a substantially horizontal axis, a parison mold and a neck mold mounted on said drum for opening and closing movement, a mechanical linkage for opening and closing each of said molds, each such linkage including a pair of links connected to the halves of the mold, a cross head to which the links are pivoted, means for causing said cross head to invert with said drum and with respect to said housing, a slidable member arranged for axial movement only with respect to said drum, and having a swivel connection with said cross head concentric with the axis of said drum, and a cam roller connected to said sliding member, whereby said blank and neck molds may be independently opened and closed irrespective of the rotation of said drum about its axis or the position of said drum with respect to said housing.

11. Apparatus for forming hollow glassware, comprising a rotary carrier, a housing on said carrier, a drum mounted in said housing for rotation with respect thereto about a substantially horizontal axis, a parison mold and a neck mold mounted on said drum for opening and closing movement, independent mechanical linkages for opening and closing said parison mold and said neck mold, each such linkage including a swivel connection concentric with said drum, a member movable axially of said drum and carrying a cam roller, stationary cam means for closing said parison and neck molds and for retaining such molds closed during a major portion of the rotation of said carrier, and pneumatic cylinders independently operable to open said parison and neck molds at a dwell position of said molds for the transfer of a formed parison therefrom.

FRITZ ECKERT.